(12) United States Patent
Huck et al.

(10) Patent No.: US 9,897,963 B2
(45) Date of Patent: Feb. 20, 2018

(54) SYSTEMS AND METHODS FOR REMANUFACTURING IMAGING COMPONENTS

(71) Applicant: Static Control Components, Inc., Sanford, NC (US)

(72) Inventors: Donald R. Huck, Sanford, NC (US); Anthony D. Causey, Fuquay Varina, NC (US)

(73) Assignee: Static Control Components, Inc., Sanford, NC (US)

( * ) Notice: Subject to any disclaimer, the term of this patent is extended or adjusted under 35 U.S.C. 154(b) by 0 days.

(21) Appl. No.: 15/358,715

(22) Filed: Nov. 22, 2016

(65) Prior Publication Data

US 2017/0075288 A1    Mar. 16, 2017

Related U.S. Application Data

(63) Continuation of application No. 14/532,395, filed on Nov. 4, 2014, now Pat. No. 9,501,024, which is a continuation of application No. 13/444,511, filed on Apr. 11, 2012, now Pat. No. 8,879,959, which is a continuation of application No. 13/283,684, filed on Oct. 28, 2011, now Pat. No. 8,538,295, which is a continuation of application No. 12/902,625, filed on Oct. 12, 2010, now Pat. No. 8,073,364, which is a continuation of application No. 11/825,262, filed on Jul. 5, 2007, now Pat. No. 7,813,676.

(51) Int. Cl.
*G03G 15/00* (2006.01)
*F16D 1/10* (2006.01)
*G03G 21/18* (2006.01)
*F16H 55/02* (2006.01)
*F16H 55/17* (2006.01)

(52) U.S. Cl.
CPC .......... *G03G 15/757* (2013.01); *F16D 1/101* (2013.01); *F16H 55/02* (2013.01); *F16H 55/17* (2013.01); *G03G 15/5008* (2013.01); *G03G 21/186* (2013.01); *F16D 2001/102* (2013.01); *Y10T 74/19* (2015.01); *Y10T 74/1987* (2015.01); *Y10T 74/19851* (2015.01); *Y10T 74/2101* (2015.01)

(58) Field of Classification Search
USPC ................ 399/110, 111, 167; 403/361, 383; 492/15; 464/179, 182
See application file for complete search history.

(56) References Cited

U.S. PATENT DOCUMENTS

| | | | | |
|---|---|---|---|---|
| 5,115,272 A | * | 5/1992 | Ohmori ................... | G03G 21/08 399/110 |
| 6,226,478 B1 | * | 5/2001 | Watanabe ............... | F16D 1/101 399/117 |
| 6,336,018 B1 | * | 1/2002 | Kawai ..................... | F16D 1/101 399/117 |
| 7,006,777 B2 | * | 2/2006 | Tsunoda ............. | G03G 15/0868 399/111 |

* cited by examiner

*Primary Examiner* — Hoan Tran

(57) ABSTRACT

A drive gear for a generally cylindrical imaging component. The drive gear includes a body for engaging the generally cylindrical imaging component; a cylindrical shaft attached to the body, the cylindrical shaft having an end surface; and lobes extending longitudinally outward from the end surface.

3 Claims, 10 Drawing Sheets

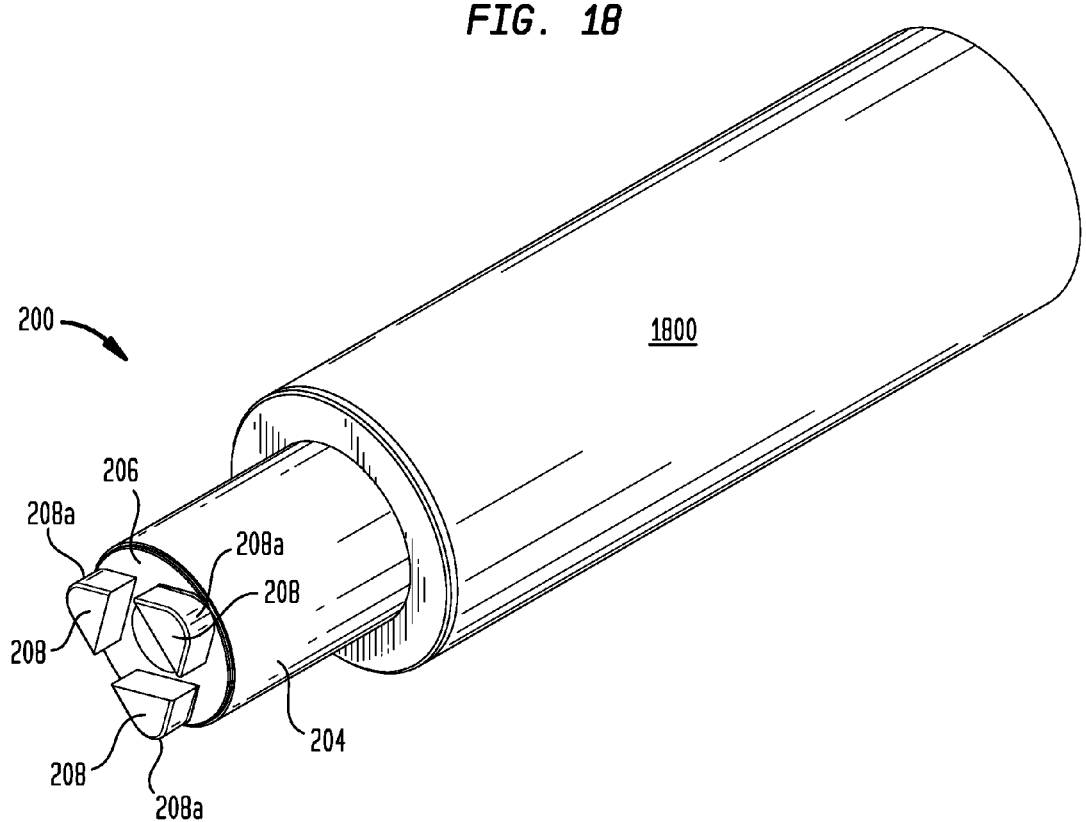

SYSTEMS AND METHODS FOR REMANUFACTURING IMAGING COMPONENTS

This application is a continuation of U.S. application Ser. No. 14/532,395 filed Nov. 4, 2014, which is a continuation of U.S. application Ser. No. 13/444,511 filed on Apr. 11, 2012, which issued as U.S. Pat. No. 8,879,959, which is a continuation of U.S. application Ser. No. 13/283,684 filed on Oct. 28, 2011, which issued as U.S. Pat. No. 8,538,295, which is a continuation of U.S. application Ser. No. 12/902,625 filed on Oct. 12, 2010, which issued as U.S. Pat. No. 8,073,364, which is a continuation of U.S. application Ser. No. 11/825,262 filed on Jul. 5, 2007, which issued as U.S. Pat. No. 7,813,676, all of which are incorporated by reference herein in its entirety.

BACKGROUND

The present invention generally relates to manufacturing, remanufacturing or repairing replaceable imaging components, and more particularly to apparatus and techniques for providing a drive gear for a drum or roller, such as an organic photo conductor (OPC) drum, for example, of a replaceable imaging cartridge adapted for holding marking material, such as toner.

In the imaging industry, there is a growing market for the remanufacture and refurbishing of various types of replaceable imaging cartridges such as toner cartridges, drum cartridges, inkjet cartridges, and the like. These imaging cartridges are used in imaging devices such as laser printers, xerographic copiers, inkjet printers, facsimile machines and the like, for example. Imaging cartridges, once spent, are unusable for their originally intended purpose. Without a refurbishing process these cartridges would simply be discarded, even though the cartridge itself may still have potential life. As a result, techniques have been developed specifically to address this issue. These processes may entail, for example, the disassembly of the various structures of the cartridge, replacing toner or ink, cleaning, adjusting or replacing any worn components and reassembling the imaging cartridge.

Laser printer toner cartridges are typically composed of two portions. One of these sections is the waste bin assembly which houses the OPC drum. The OPC may include a drive gear which engages with a printer drive member. During the remanufacturing of a laser printer toner cartridge, the OPC drum may need to be replaced due to the wear or damage of the OPC drum. The replacement OPC drum may include a replacement drive gear, or gear, attached to one end of the replacement OPC drum. The present invention provides for an improved replacement drive gear.

SUMMARY

In one aspect of the present invention, a drive gear for a generally cylindrical imaging component includes a body for engaging the generally cylindrical imaging component; a cylindrical shaft attached to the body, the cylindrical shaft having an end surface; and three prongs extending longitudinally outward from the end surface.

In another aspect of the present invention, an imaging apparatus assembly includes a drive mechanism including a helical recess; and a drive gear including a body for engaging a generally cylindrical imaging component; a cylindrical shaft attached to the body, the cylindrical shaft having an end surface; and three prongs extending longitudinally outward from the end surface and engaging the helical recess.

In another aspect of the present invention, an imaging apparatus assembly includes a generally cylindrical imaging component; and a drive gear including a body engaging a generally cylindrical imaging component; a cylindrical shaft attached to the body, the cylindrical shaft having an end surface; and three prongs extending longitudinally outward from the end surface.

A more complete understanding of the present invention, as well as further features and advantages of the invention, will be apparent from the following detailed description and the accompanying drawings.

BRIEF DESCRIPTION OF THE DRAWINGS

FIG. 18 shows a drive gear and OPC drum in accordance with the present invention.

DETAILED DESCRIPTION

The following detailed description of preferred embodiments refers to the accompanying drawings which illustrate specific embodiments of the invention. In the discussion that follows, specific systems and techniques for providing a drive gear for a drum or roller, such as an organic photo conductor (OPC) drum, for example, of a replaceable imaging cartridge adapted for holding marking material, are disclosed. Other embodiments having different structures and operations for the repair, remanufacture and operation of other types of replaceable imaging components and for various types of imaging devices, such as laser printers, inkjet printers, copiers, facsimile machines and the like, do not depart from the scope of the present invention.

Figure 1:
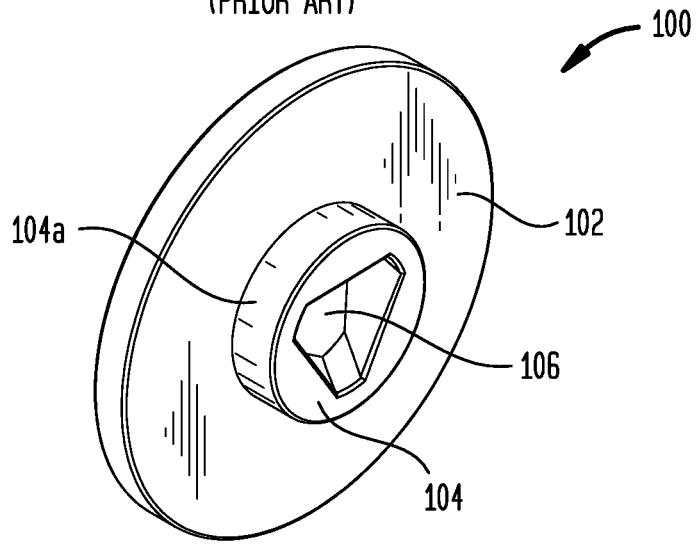
FIG. 1 shows a perspective view of a prior art drive mechanism.

FIG. 1 shows a prior art drive mechanism 100. The drive mechanism 100 may include a body 102 having a raised section 104. A helical recess 106 may be formed in the raised section 104. The raised section 104 may include an outer cylindrical surface 104a. In operation, the drive mechanism 100 is part of a printer and engages a gear (not shown) having a shaped helical extrusion on an imaging cartridge, and causes the gear with the helical extrusion to rotate. Further details of such a prior art drive mechanism 100 and gear are disclosed in U.S. Pat. No. 6,400,914 which is incorporated by reference herein in its entirety.

Figure 2:
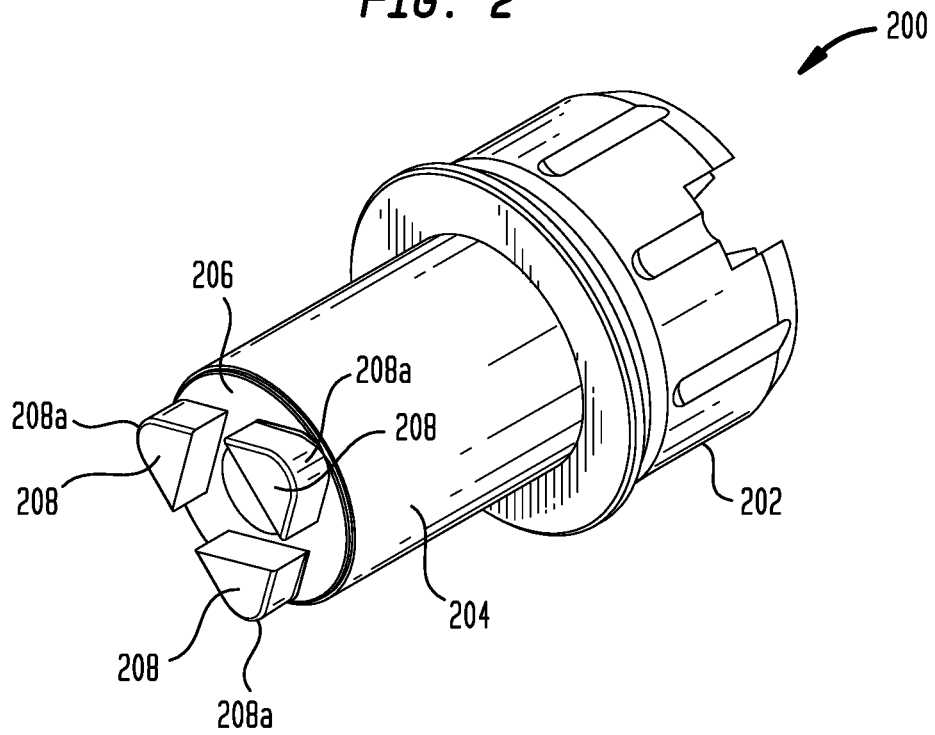
FIGS. 2-17 show perspective views of multiple embodiments of a drive gear in accordance with the present invention.

FIG. 2 shows a drive gear 200 in accordance with the present invention. One end of the drive gear 200 is adapted to be attached to a hollow roller or generally cylindrical imaging component, such as an OPC drum. The other end of the drive gear 200 is adapted to engage the helical recess 106 of the drive mechanism 100 of a printer. The drive gear 200 includes a body 202 for engaging the generally cylindrical imaging component and a cylindrical shaft 204 attached to the body 202. The cylindrical shaft 204 has an end surface 206. Three prongs 208 extend longitudinally outward from the end surface 206 and are shaped to engage the helical recess 106 of the drive mechanism 100. Each of the three prongs 208 may be generally triangular in shape with one vertex 208a of each triangular shaped prong 208 being generally rounded.

When the user closes a door of the printer, the drive mechanism 100 slides onto the cartridge drive gear 200 so that the three drive gear prongs 208 are inserted into the helical recess 106. As the printer drive mechanism 100 rotates, the three prongs 208 are engaged, and the entire cartridge drive gear 200 rotates, which in turn drives an OPC (not shown) attached to the drive gear 200. In this embodiment, only the OPC is rotated by this drive interface, however this design is not limited only to this embodiment. The drive gear may include one or more gears which drive the rest of the cartridge components in addition to the OPC.

Figure 3:
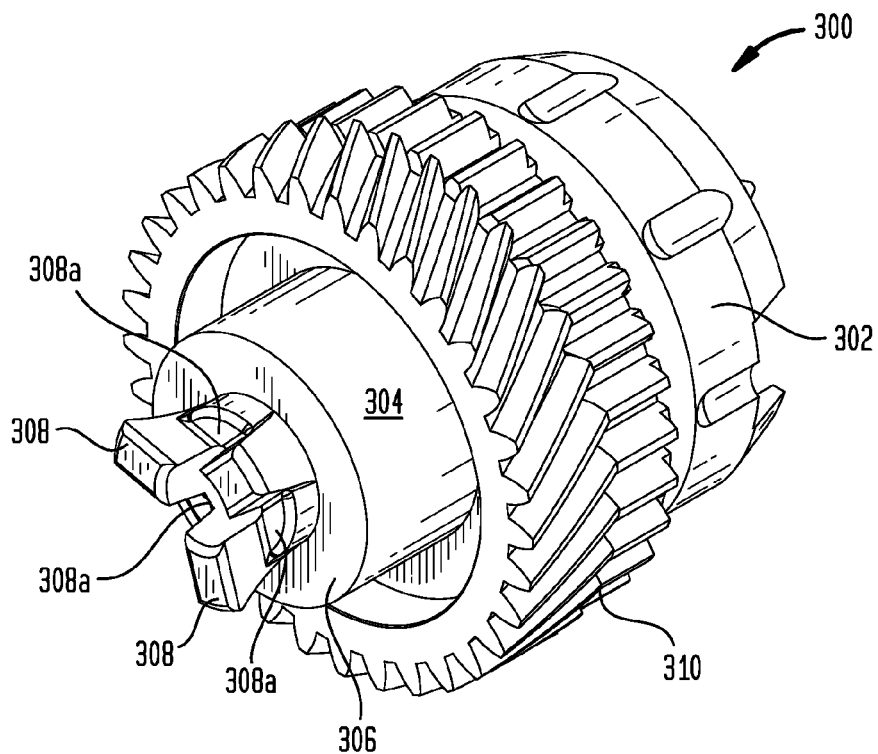

FIG. 3 shows a drive gear 300 in accordance with the present invention. One end of the drive gear 300 is adapted to be attached to a hollow roller or generally cylindrical imaging component, such as an OPC drum. The other end of the drive gear 300 is adapted to engage the helical recess 106 of the drive mechanism 100 of a printer. The drive gear 300 includes a body 302 for engaging the generally cylindrical imaging component and a cylindrical shaft 304 attached to the body 302. The cylindrical shaft 304 has an end surface 306. Three prongs 308 extend longitudinally and radially outward from the end surface 306 and are shaped to engage the helical recess 106 of the drive mechanism 100. Each of the prongs 308 may be generally rectangular in cross section. Bracing members 308a may be disposed between the prongs 308. The drive gear 300 may include one or more gears 310 which drive the additional cartridge components.

Figure 4:
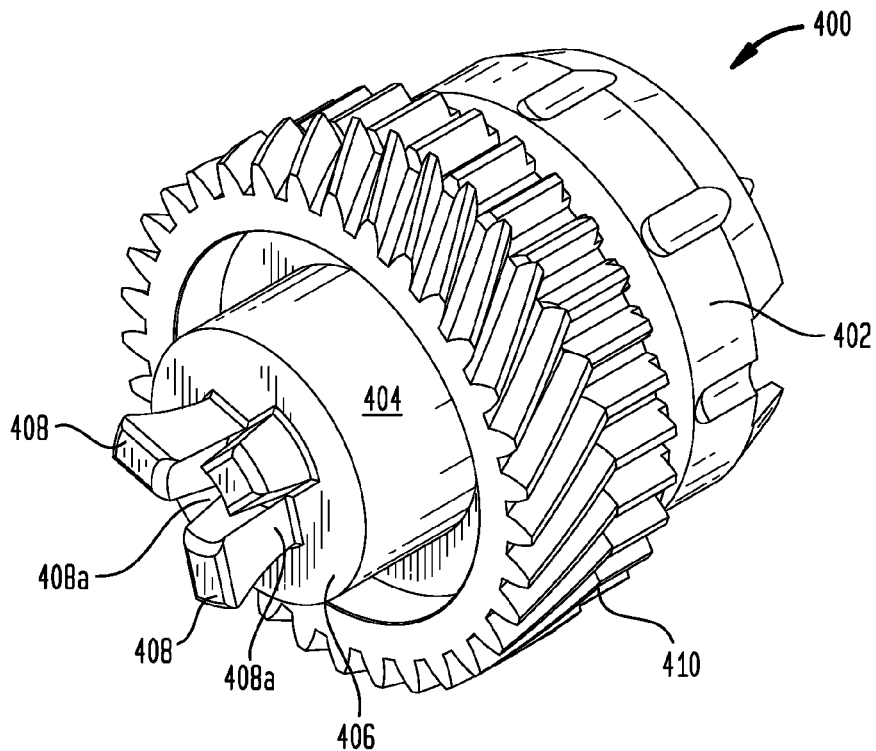

FIG. 4 shows a drive gear 400 in accordance with the present invention. One end of the drive gear 400 is adapted to be attached to a hollow roller or generally cylindrical imaging component, such as an OPC drum. The other end of the drive gear 400 is adapted to engage the helical recess 106 of the drive mechanism 100 of a printer. The drive gear 400 includes a body 402 for engaging the generally cylindrical imaging component and a cylindrical shaft 404 attached to the body 402. The cylindrical shaft 404 has an end surface 406. Three prongs 408 extend longitudinally and radially outward from the end surface 406 and are shaped to engage the helical recess 106 of the drive mechanism 100. Each of the prongs 408 may be generally rectangular in cross section. The drive gear 400 may include one or more gears 410 which drive the additional cartridge components.

Figure 5:
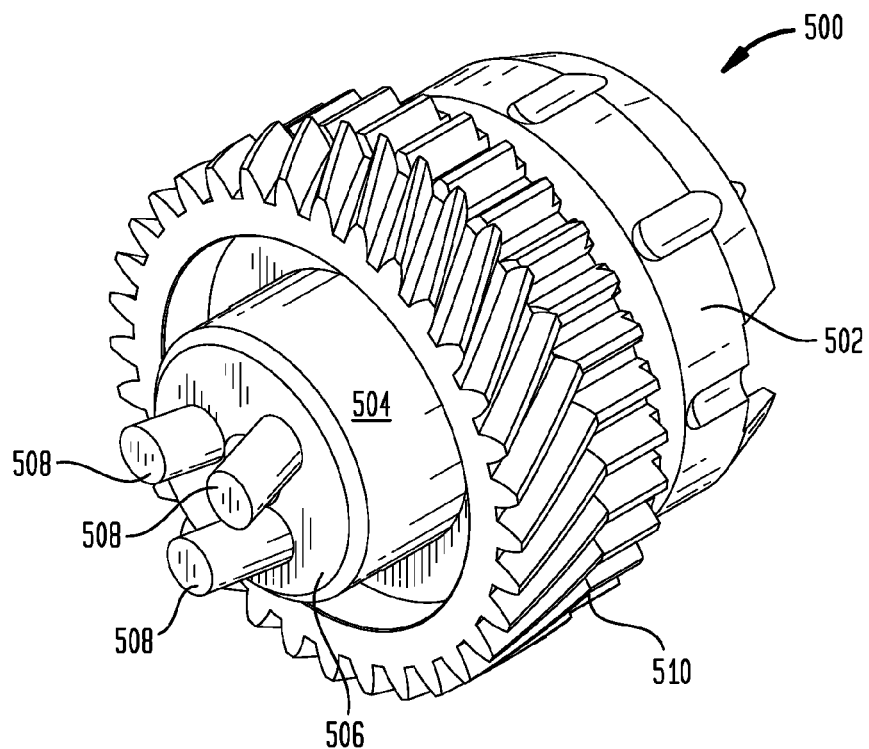

FIG. 5 shows a drive gear 500 in accordance with the present invention. One end of the drive gear 500 is adapted to be attached to a hollow roller or generally cylindrical imaging component, such as an OPC drum. The other end of the drive gear 500 is adapted to engage the helical recess 106 of the drive mechanism 100 of a printer. The drive gear 500 includes a body 502 for engaging the generally cylindrical imaging component and a cylindrical shaft 504 attached to the body 502. The cylindrical shaft 504 has an end surface 506. Three prongs 508 extend longitudinally outward from the end surface 506 and are shaped to engage the helical recess 106 of the drive mechanism 100. Each of the prongs 508 may be generally circular in cross section and may be inclined at a slight angle to the end surface 506 in a twisted fashion. The drive gear 500 may include one or more gears 510 which drive the additional cartridge components.

Figure 6:
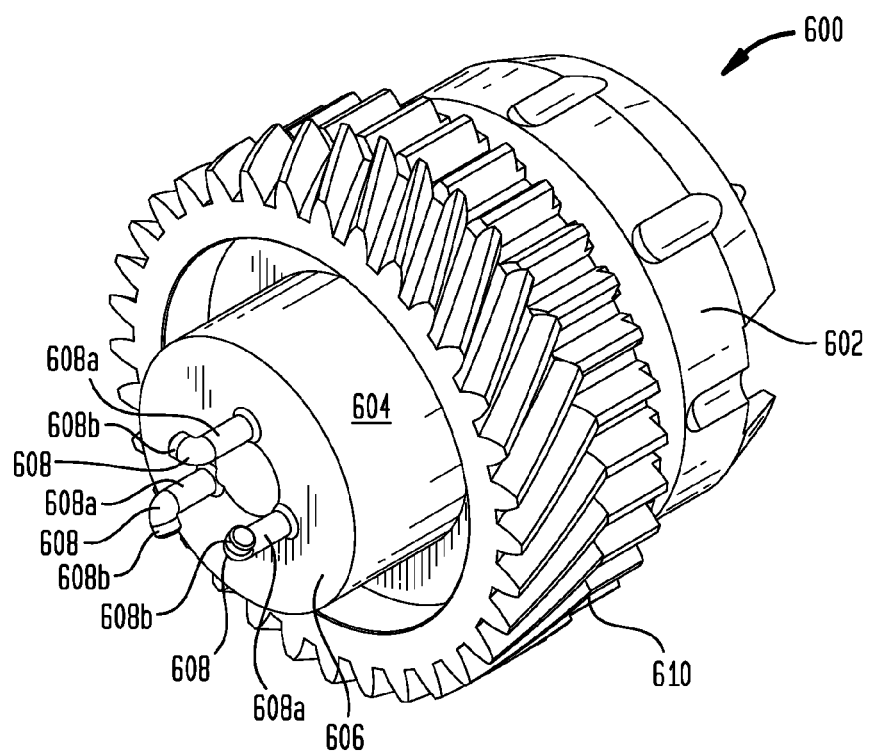

FIG. 6 shows a drive gear 600 in accordance with the present invention. One end of the drive gear 600 is adapted to be attached to a hollow roller or generally cylindrical imaging component, such as an OPC drum. The other end of the drive gear 600 is adapted to engage the helical recess 106 of the drive mechanism 100 of a printer. The drive gear 600 includes a body 602 for engaging the generally cylindrical imaging component and a cylindrical shaft 604 attached to the body 602. The cylindrical shaft 604 has an end surface 606. Three prongs 608 extend longitudinally and latitudinally outward from the end surface 606 and are shaped to engage the helical recess 106 of the drive mechanism 100. Each of the prongs 608 may include a longitudinal element 608a and a latitudinal element 608b. The drive gear 600 may include one or more gears 610 which drive the additional cartridge components.

Figure 7:
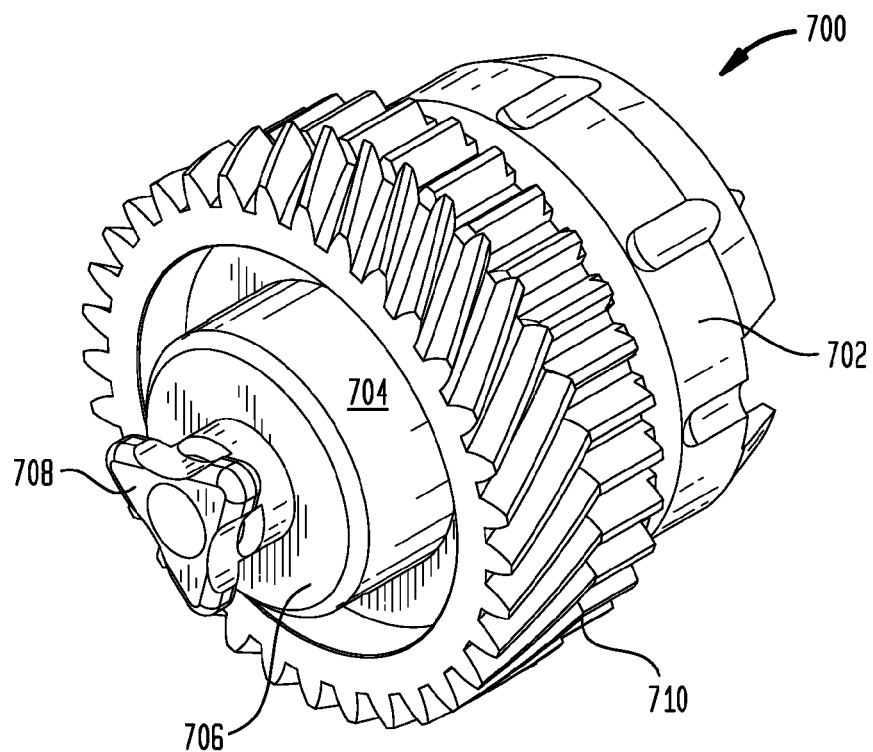

FIG. 7 shows a drive gear 700 in accordance with the present invention. One end of the drive gear 700 is adapted to be attached to a hollow roller or generally cylindrical imaging component, such as an OPC drum. The other end of the drive gear 700 is adapted to engage the helical recess 106 of the drive mechanism 100 of a printer. The drive gear 700 includes a body 702 for engaging the generally cylindrical imaging component and a cylindrical shaft 704 attached to the body 702. The cylindrical shaft 704 has an end surface 706. A triangular shaped element 708 extends outward from the end surface 706 and is shaped to engage the helical recess 106 of the drive mechanism 100. The drive gear 700 may include one or more gears 710 which drive the additional cartridge components.

Figure 8:
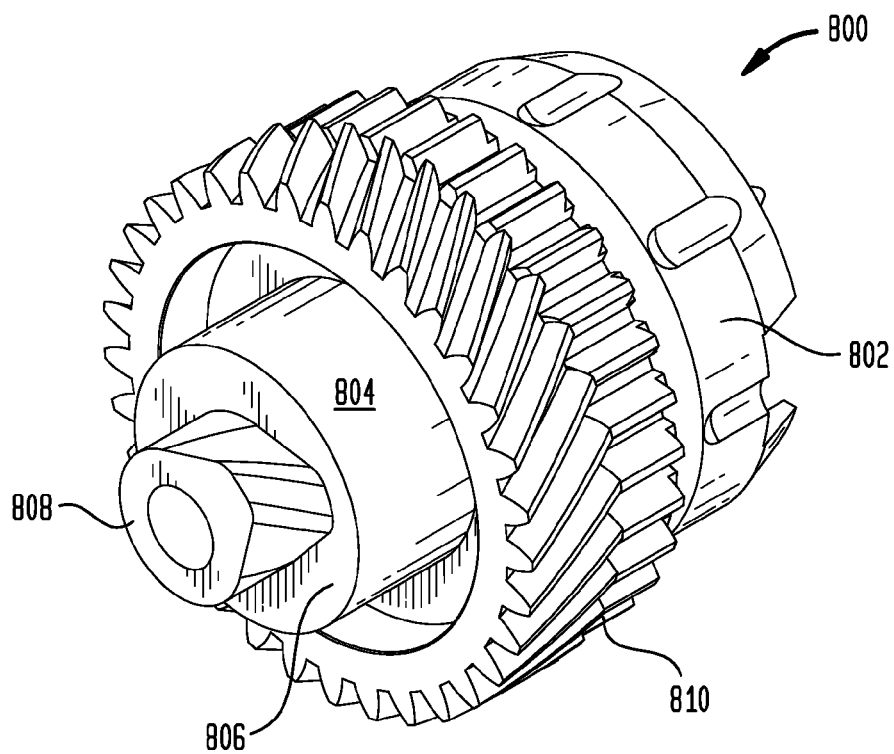

FIG. 8 shows a drive gear 800 in accordance with the present invention. One end of the drive gear 800 is adapted to be attached to a hollow roller or generally cylindrical imaging component, such as an OPC drum. The other end of the drive gear 800 is adapted to engage the helical recess 106 of the drive mechanism 100 of a printer. The drive gear 800 includes a body 802 for engaging the generally cylindrical imaging component and a cylindrical shaft 804 attached to the body 802. The cylindrical shaft 804 has an end surface 806. A cam shaped element 808 extends outward from the end surface 806 and is shaped to engage the helical recess 106 of the drive mechanism 100. The drive gear 800 may include one or more gears 810 which drive the additional cartridge components.

Figure 9:
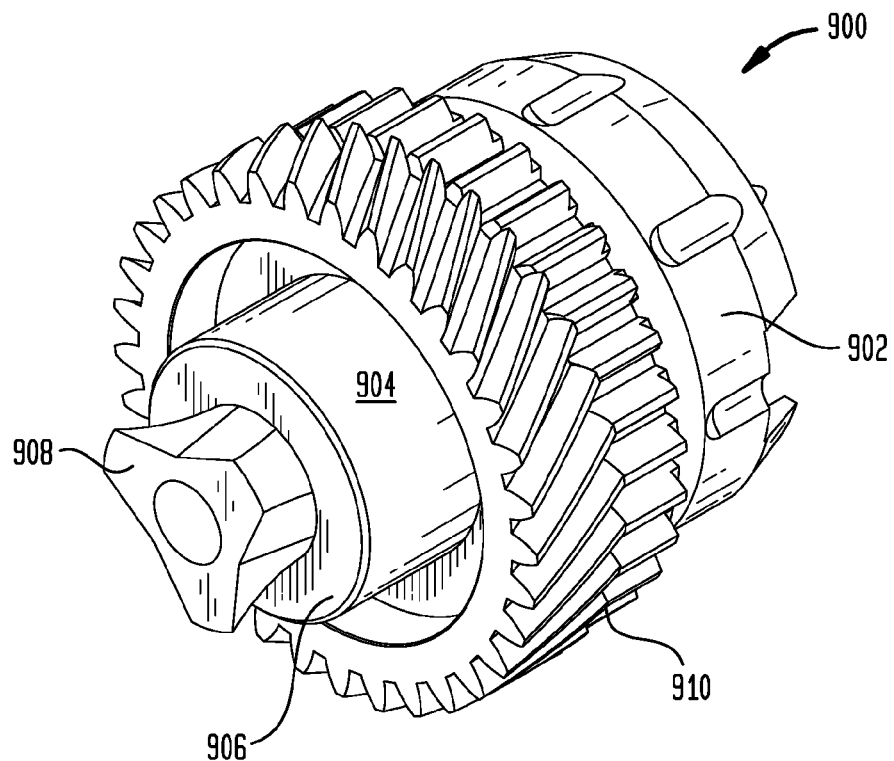

FIG. 9 shows a drive gear 900 in accordance with the present invention. One end of the drive gear 900 is adapted to be attached to a hollow roller or generally cylindrical imaging component, such as an OPC drum. The other end of the drive gear 900 is adapted to engage the helical recess 106 of the drive mechanism 100 of a printer. The drive gear 900 includes a body 902 for engaging the generally cylindrical imaging component and a cylindrical shaft 904 attached to the body 902. The cylindrical shaft 904 has an end surface 906. A generally triangular shaped element 908 extends and flares outward from the end surface 906 and is shaped to engage the helical recess 106 of the drive mechanism 100. The drive gear 900 may include one or more gears 910 which drive the additional cartridge components.

Figure 10:
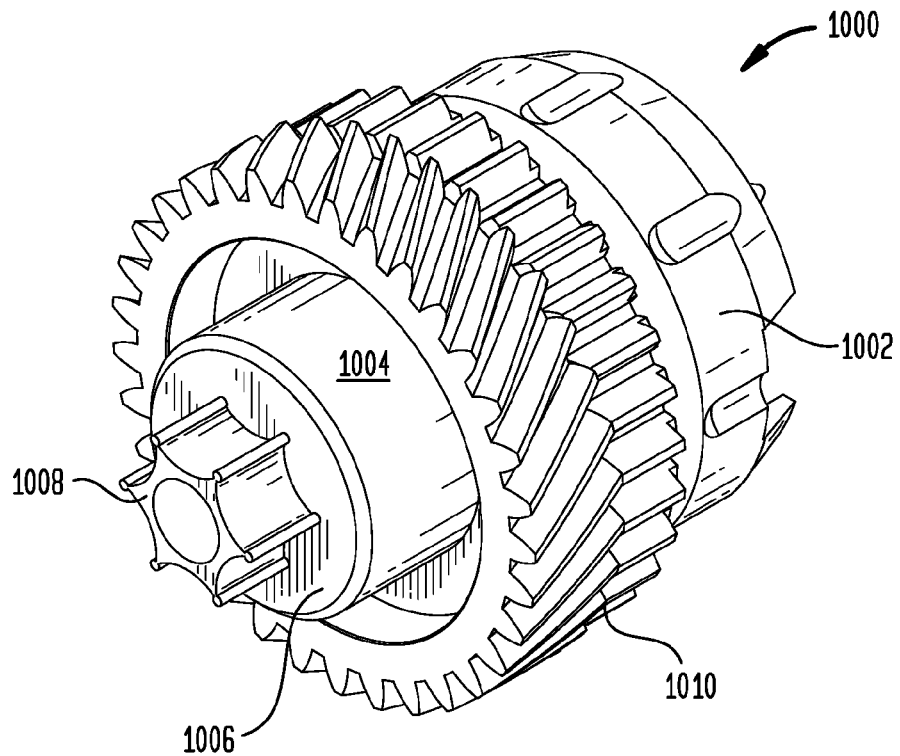

FIG. 10 shows a drive gear 1000 in accordance with the present invention. One end of the drive gear 1000 is adapted to be attached to a hollow roller or generally cylindrical imaging component, such as an OPC drum. The other end of the drive gear 1000 is adapted to engage the helical recess 106 of the drive mechanism 100 of a printer. The drive gear 1000 includes a body 1002 for engaging the generally cylindrical imaging component and a cylindrical shaft 1004 attached to the body 1002. The cylindrical shaft 1004 has an end surface 1006. A six-pointed star shaped element 1008 extends outward from the end surface 1006 and is shaped to engage the helical recess 106 of the drive mechanism 100. The drive gear 1000 may include one or more gears 1010 which drive the additional cartridge components.

Figure 11:
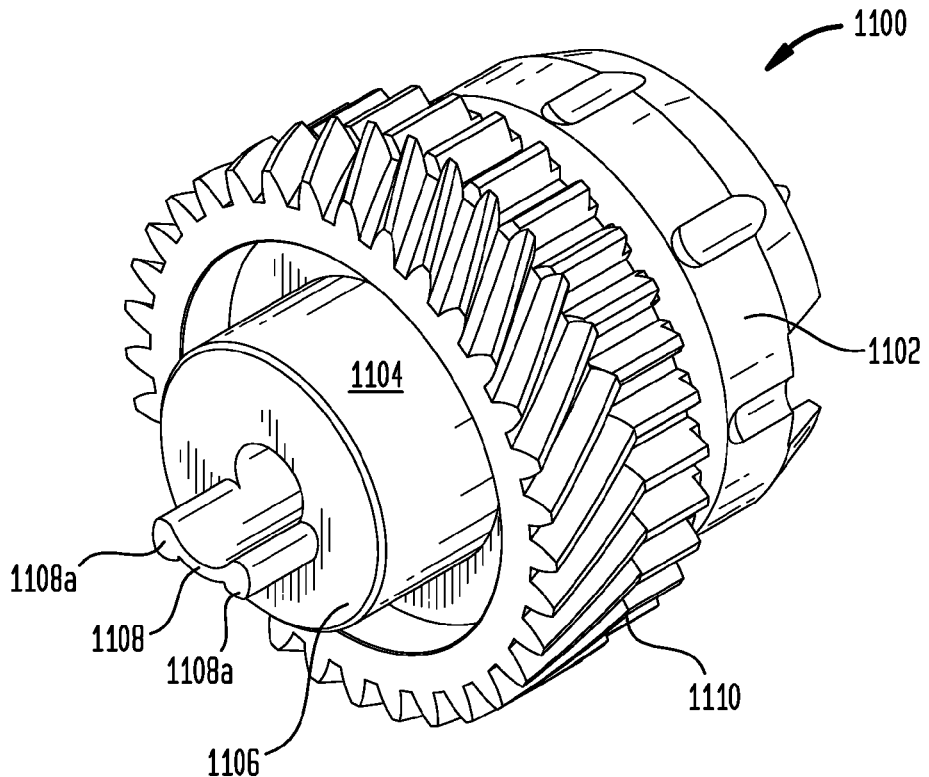

FIG. 11 shows a drive gear 1100 in accordance with the present invention. One end of the drive gear 1100 is adapted to be attached to a hollow roller or generally cylindrical imaging component, such as an OPC drum. The other end of the drive gear 1100 is adapted to engage the helical recess 106 of the drive mechanism 100 of a printer. The drive gear 1100 includes a body 1102 for engaging the generally cylindrical imaging component and a cylindrical shaft 1104 attached to the body 1102. The cylindrical shaft 1104 has an end surface 1106. An off-center element 1108 having two lobes 1108a extends outward from the end surface 1106 and is shaped to engage the helical recess 106 of the drive mechanism 100. The drive gear 1100 may include one or more gears 1110 which drive the additional cartridge components.

Figure 12:
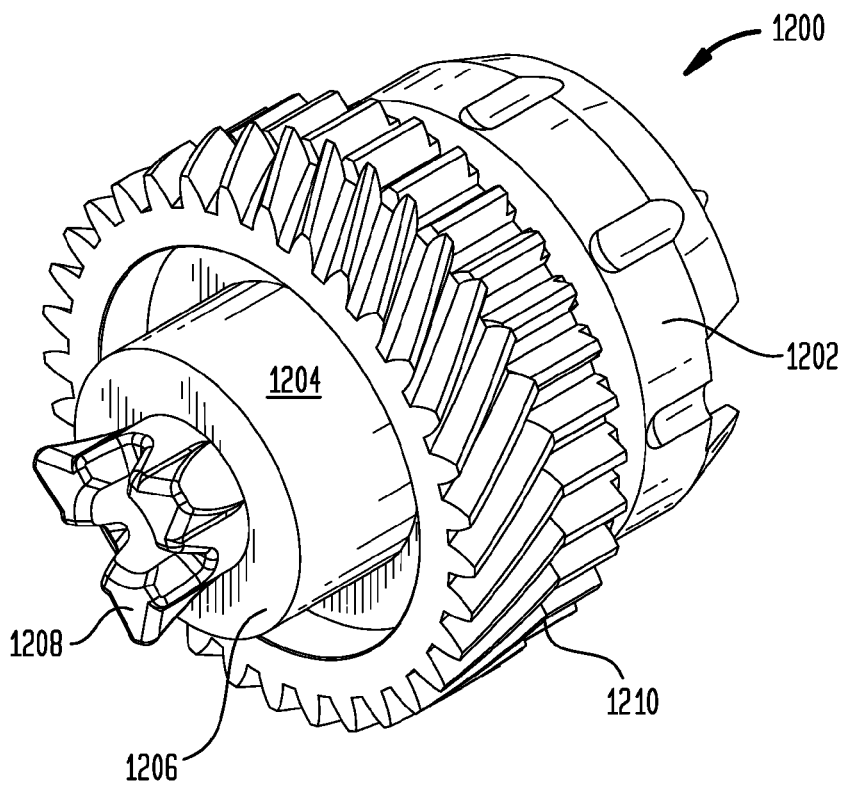

FIG. 12 shows a drive gear 1200 in accordance with the present invention. One end of the drive gear 1200 is adapted to be attached to a hollow roller or generally cylindrical imaging component, such as an OPC drum. The other end of the drive gear 1200 is adapted to engage the helical recess 106 of the drive mechanism 100 of a printer. The drive gear 1200 includes a body 1202 for engaging the generally cylindrical imaging component and a cylindrical shaft 1204 attached to the body 1202. The cylindrical shaft 1204 has an end surface 1206. A tri-lobe element 1208 flares outward from the end surface 1206 and is shaped to engage the helical recess 106 of the drive mechanism 100. The drive gear 1200 may include one or more gears 1210 which drive the additional cartridge components.

Figure 13:
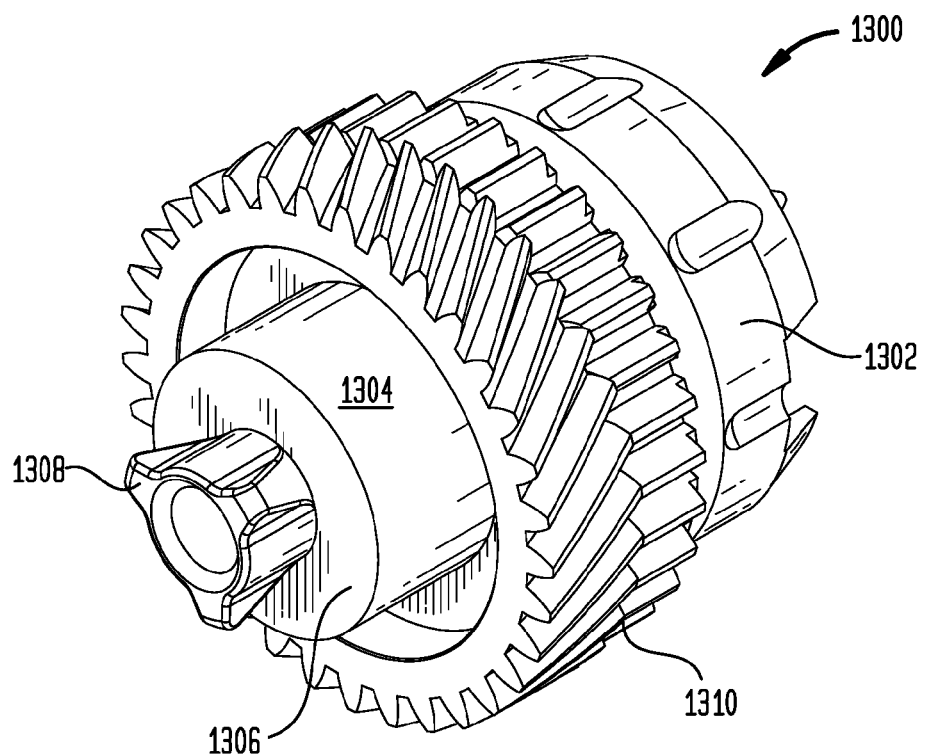

FIG. 13 shows a drive gear 1300 in accordance with the present invention. One end of the drive gear 1300 is adapted to be attached to a hollow roller or generally cylindrical imaging component, such as an OPC drum. The other end of the drive gear 1300 is adapted to engage the helical recess 106 of the drive mechanism 100 of a printer. The drive gear 1300 includes a body 1302 for engaging the generally cylindrical imaging component and a cylindrical shaft 1304 attached to the body 1302. The cylindrical shaft 1304 has an end surface 1306. A tri-lobe element 1308 flares outward from the end surface 1306 and is shaped to engage the helical recess 106 of the drive mechanism 100. The drive gear 1300 may include one or more gears 1310 which drive the additional cartridge components.

Figure 14:
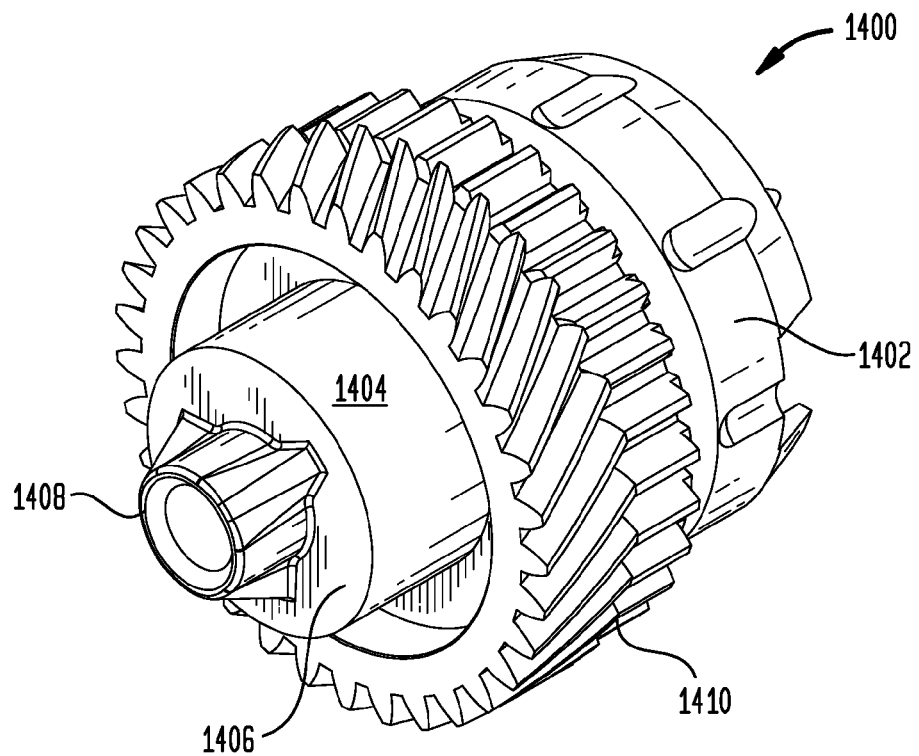

FIG. 14 shows a drive gear 1400 in accordance with the present invention. One end of the drive gear 1400 is adapted to be attached to a hollow roller or generally cylindrical imaging component, such as an OPC drum. The other end of the drive gear 1400 is adapted to engage the helical recess 106 of the drive mechanism 100 of a printer. The drive gear 1400 includes a body 1402 for engaging the generally cylindrical imaging component and a cylindrical shaft 1404 attached to the body 1402. The cylindrical shaft 1404 has an end surface 1406. A tri-lobe element 1408 extends outward from the end surface 1406 and is shaped to engage the helical recess 106 of the drive mechanism 100. As shown in FIG. 14, the tri-lobe element 1408 narrows inwards towards a rotational axis of the drive gear 1400 as the tri-lobe element 1408 extends outward from the end surface 1406. The drive gear 1400 may include one or more gears 1410 which drive the additional cartridge components.

Figure 15:
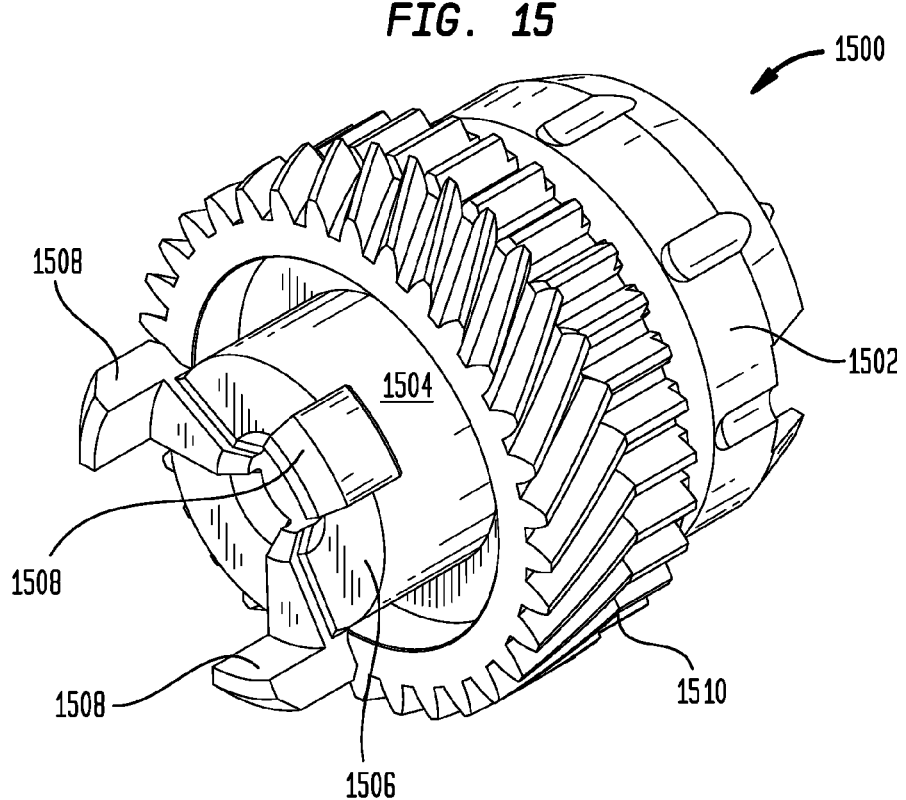

FIG. 15 shows a drive gear 1500 in accordance with the present invention. One end of the drive gear 1500 is adapted to be attached to a hollow roller or generally cylindrical imaging component, such as an OPC drum. The other end of the drive gear 1500 is adapted to engage the drive mechanism 100 of a printer. The drive gear 1500 includes a body 1502 for engaging the generally cylindrical imaging component and a cylindrical shaft 1504 attached to the body 1502. The cylindrical shaft 1504 has an end surface 1506. Three prongs 1508 extend longitudinally and radially outward from the end surface 1506 and are shaped to grip outer cylindrical surface 104a of the drive mechanism 100. The drive gear 1500 may include one or more gears 1510 which drive the additional cartridge components.

Figure 16:
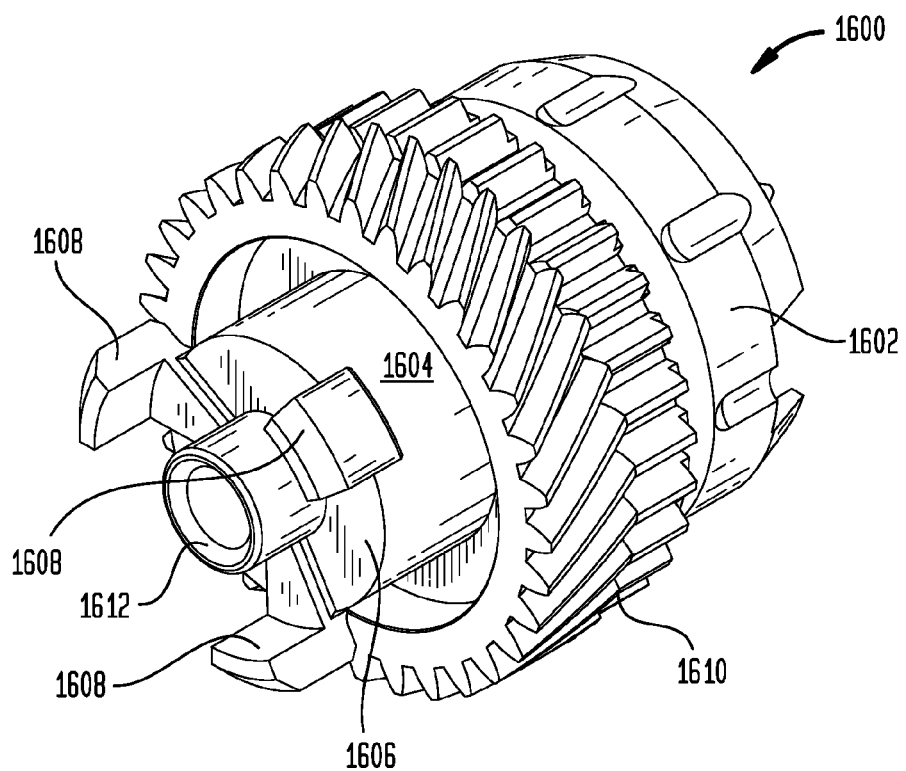

FIG. 16 shows a drive gear 1600 in accordance with the present invention. One end of the drive gear 1600 is adapted to be attached to a hollow roller or generally cylindrical imaging component, such as an OPC drum. The other end of the drive gear 1600 is adapted to engage the drive mechanism 100 of a printer. The drive gear 1600 includes a body 1602 for engaging the generally cylindrical imaging component and a cylindrical shaft 1604 attached to the body 1602. The cylindrical shaft 1604 has an end surface 1606. Three prongs 1608 extend longitudinally and radially outward from the end surface 1506 and are shaped to grip the outer cylindrical surface 104a of the drive mechanism 100. A cylindrical element 1612 extends outward to engage the helical recess 106 of the drive mechanism 100. The drive gear 1600 may include one or more gears 1610 which drive the additional cartridge components.

Figure 17:
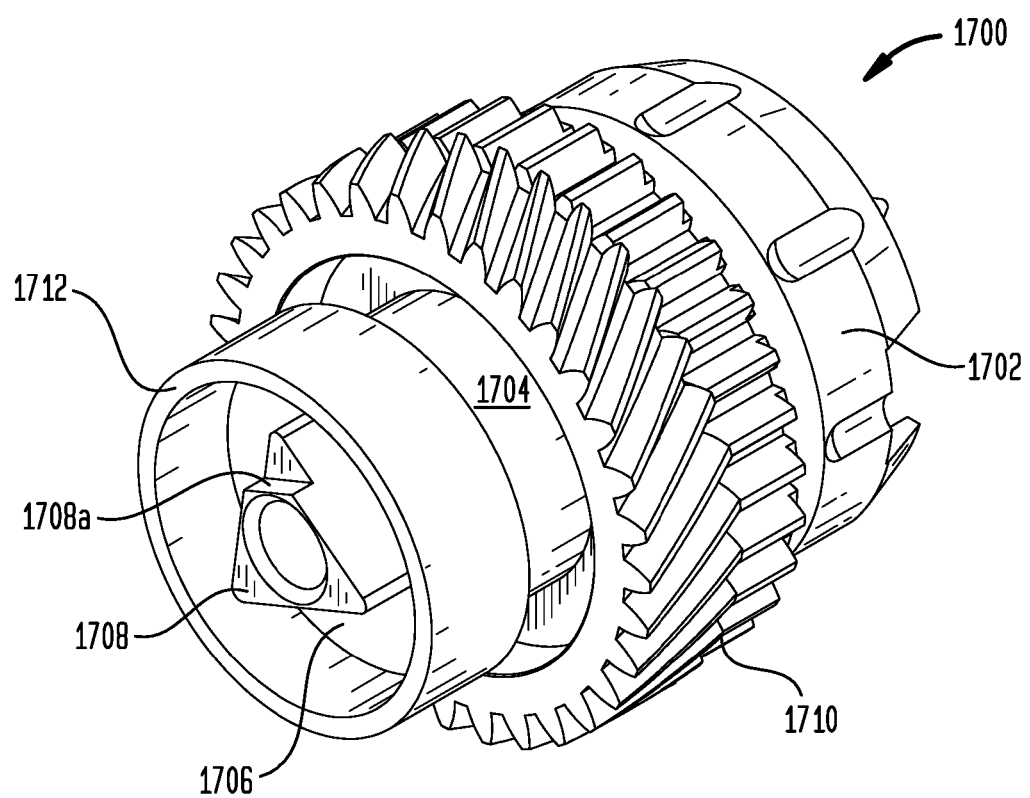

FIG. 17 shows a drive gear 1700 in accordance with the present invention. One end of the drive gear 1700 is adapted to be attached to a hollow roller or generally cylindrical imaging component, such as an OPC drum. The other end of the drive gear 1700 is adapted to engage the helical recess 106 of the drive mechanism 100 of a printer. The drive gear 1700 includes a body 1702 for engaging the generally cylindrical imaging component and a cylindrical shaft 1704 attached to the body 1702. The cylindrical shaft 1704 has an end surface 1706. A triangular shaped element 1708 extends longitudinally outward from the end surface 1706 and is shaped to engage the helical recess 106 of the drive mechanism 100. The element may generally triangular in shape but missing one vertex 1708a. A cylindrical shaped element 1712 is shaped to engage the outer cylindrical surface 104a of the drive mechanism 100. The drive gear 1700 may include one or more gears 1710 which drive the additional cartridge components.

FIG. 18 shows the drive gear 200 attached to an OPC drum 1800 in accordance with the present invention.

Although specific embodiments have been illustrated and described herein, those of ordinary skill in the art appreciate that any arrangement that is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A drive gear for a generally cylindrical imaging component, the drive gear comprising:
   a body for engaging the generally cylindrical imaging component having a rotational axis;
   an end surface attached to the body; and
   a lobed element for engaging a recess, said lobe element extending outward from the end surface, said lobed element narrowing inward towards the rotational axis as the lobed element extends outward from the end surface.

2. The drive gear of claim 1 wherein the end surface is attached to the body by a cylindrical shaft.

3. The drive gear of claim 1 wherein the lobed element comprises three lobes.

* * * * *